United States Patent [19]
Jones

[11] Patent Number: 5,057,727
[45] Date of Patent: Oct. 15, 1991

[54] SHAFT POSITION SENSOR EMPLOYING A WIEGAND-EFFECT DEVICE

[75] Inventor: Donald W. Jones, Burnt Hills, N.Y.

[73] Assignee: General Electric Company, Schenectady, N.Y.

[21] Appl. No.: 611,567

[22] Filed: Nov. 13, 1990

[51] Int. Cl.⁵ ........................................... H02K 11/00
[52] U.S. Cl. .................................. 310/68 B; 310/111; 310/155; 310/168; 310/181; 310/261; 324/174; 324/207.15
[58] Field of Search ............... 310/155, 162, 111, 168, 310/169, 170, 208, 68 B, 181, 261; 324/173, 174, 207.13, 207.15

[56] References Cited

U.S. PATENT DOCUMENTS

| | | | |
|---|---|---|---|
| 3,947,711 | 3/1976 | Presley et al. | 310/155 |
| 3,999,107 | 12/1976 | Reuting | 310/181 |
| 4,150,314 | 4/1979 | Zabler et al. | 310/155 |
| 4,217,512 | 9/1980 | Hauler | 310/155 |
| 4,700,133 | 10/1987 | Day | 310/168 |

OTHER PUBLICATIONS

Bulletin No. 2000, Sensor Engineering Co., pp. 1-2; (81) 1987; Hamden, Conn.

Primary Examiner—R. Skudy
Attorney, Agent, or Firm—Jill M. Breedlove; James C. Davis, Jr.; Marvin Snyder

[57] ABSTRACT

A Wiegand-effect shaft position sensor is excited by an alternating magnetic field generated by stationary magnets or solenoids interacting with a high-strength, toothed wheel that is fixed to the rotor. A set of three stationary poles are situated proximate to the rotor and are connected together by a yoke. The magnets or solenoids are mounted in the outside poles of the set of three stationary poles. The central stationary pole contains a Wiegand-effect device. In operation, a flux reversal in the Wiegand-effect device occurs at twice the frequency at which the poles of the toothed wheel pass the stationary poles, resulting in the generation of sharp voltage pulses indicative of rotor position.

7 Claims, 2 Drawing Sheets

SHAFT POSITION SENSOR EMPLOYING A WIEGAND-EFFECT DEVICE

FIELD OF THE INVENTION

The present invention relates generally to shaft position sensors for sensing rotor position in an electronically commutated motor drive and, more particularly, to a such a shaft position sensor employing a Wiegand-effect device.

BACKGROUND OF THE INVENTION

To achieve proper phase commutation in an electronically commutated motor drive, such as, for example, a switched reluctance motor drive, a shaft position sensor is generally needed for feeding back a rotor position signal to a controller. Disadvantageously, such shaft position sensors, e.g. resolvers, are generally delicate and costly. Specifically, one shortcoming of such devices is that an electrical pulse which is generated for each passing tooth of the rotor is typically broad and decreases in magnitude as rotor speed decreases. On the other hand, conventional shaft position sensors utilizing the Wiegand effect produce strong, sharp signals, even at low speeds and zero speed, upon the reversal of an imposed magnetic field. Specifically, the Wiegand effect involves the generation of sharp electrical pulses in a coil wrapped around, or otherwise situated in close proximity to, a Wiegand wire in the presence of a changing magnetic field. A Wiegand wire has a relatively hard outer shell of high-permeability magnetic material and a relatively soft core of low-permeability magnetic material, or vice versa. The field reversal in a Wiegand-effect device is typically accomplished by attaching permanent magnet material to the rotating shaft and magnetizing it with alternating north and south poles. When the applied magnetic field reverses direction, the direction of magnetization in the soft core abruptly changes its direction of magnetization to match that of the applied field, generating a sharp voltage pulse across the coil. Thereafter, when the applied magnetic field again reverses direction, the direction of magnetization in the core again reverses direction and generates another sharp voltage pulse, but of opposite polarity. Unfortunately, such conventional Wiegand-effect shaft position sensors employing permanent magnets mounted on the rotor are unsuitable for use in high-speed machines having highly stressed rotors.

OBJECTS OF THE INVENTION

Accordingly, an object of the present invention is to provide an improved Wiegand-effect shaft position sensor suitable for determining rotor position in a high-speed machine.

Another object of the present invention is to provide an improved Wiegand-effect shaft position sensor which does not require the attachment of permanent magnets to the rotor.

SUMMARY OF THE INVENTION

The foregoing and other objects of the present invention are achieved in a motor shaft position sensor employing a Wiegand-effect device which is excited by an alternating magnetic field generated by stationary magnets or solenoids interacting with a high-strength, toothed wheel that is fixed to the rotor. A set of three stationary poles are situated proximate to the rotor and are connected together by a yoke. The magnets or solenoids are mounted in the outside poles of the set of three stationary poles. The central stationary pole contains the Wiegand-effect device. The pole pitch $\theta$ of the toothed wheel, and hence that of the rotor, is related to the pole pitch $\phi$ of the stationary pole set according to the following expression:

$$2\phi = (N + \tfrac{1}{2})\theta,$$

where N is an integer, i.e. 1, 2, 3, ... In operation, a flux reversal in the Wiegand-effect device occurs at twice the frequency at which the poles of the toothed wheel pass the stationary poles, resulting in the generation of sharp voltage pulses indicative of rotor position.

BRIEF DESCRIPTION OF THE DRAWING

The features and advantages of the present invention will become apparent from the following detailed description of the invention when read with the accompanying drawings in which.

DETAILED DESCRIPTION OF THE INVENTION

Figure 1:
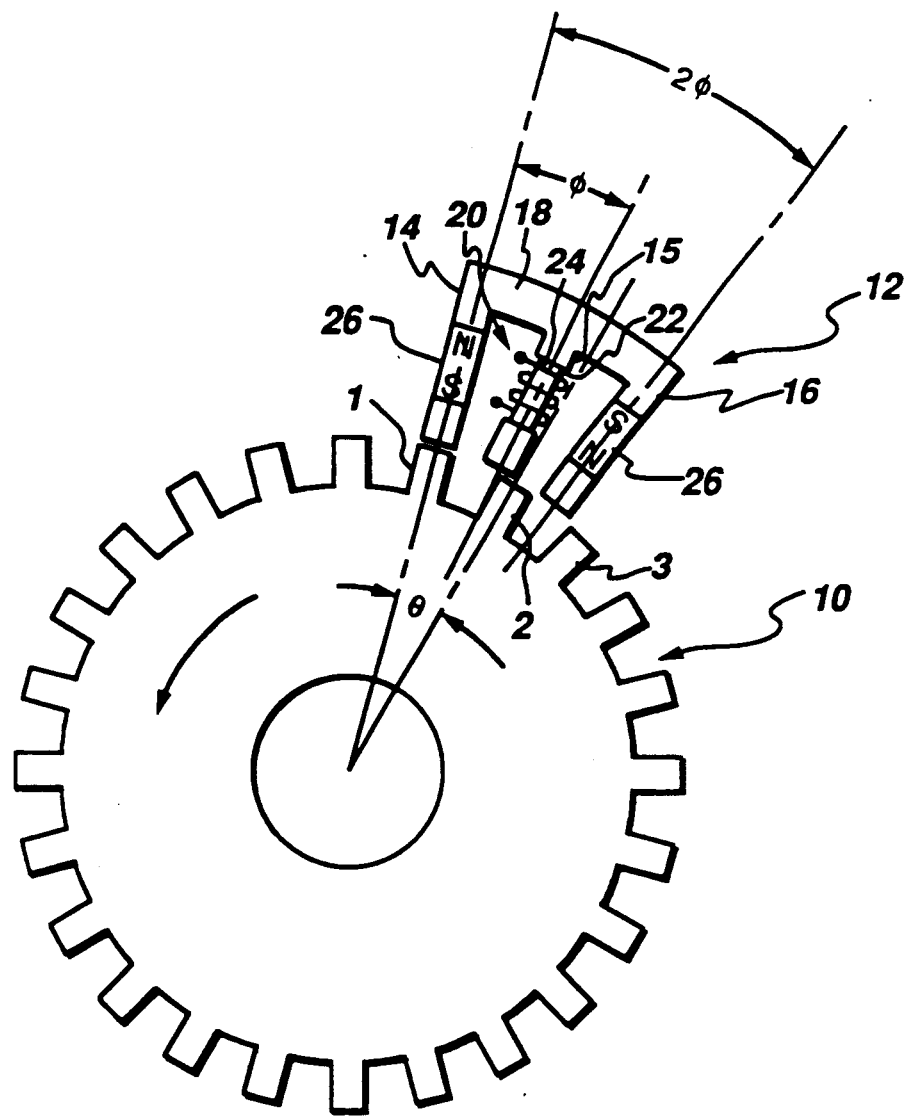
FIG. 1 illustrates a Wiegand-effect shaft position sensor according to the present invention wherein N=1.

FIG. 1 illustrates a preferred embodiment of the shaft position sensor of the present invention. The shaft position sensor includes a toothed wheel 10 mounted to the rotor (not shown) of a motor. Preferably, toothed wheel 10 has the same number, or an integral multiple, of poles as the rotor. The poles of the toothed wheel are equally spaced from each other. The rotor and toothed wheel 10 are, in turn, mounted to a motor shaft (not shown). Preferably, toothed wheel 10 comprises a ferromagnetic material, such as a high-strength, low-alloy steel, e.g. AISI 4140, which may be either solid or laminated. Also shown in FIG. 1 is a stationary pole set 12 including poles 14–16 connected by a yoke 18.

Figure 2:
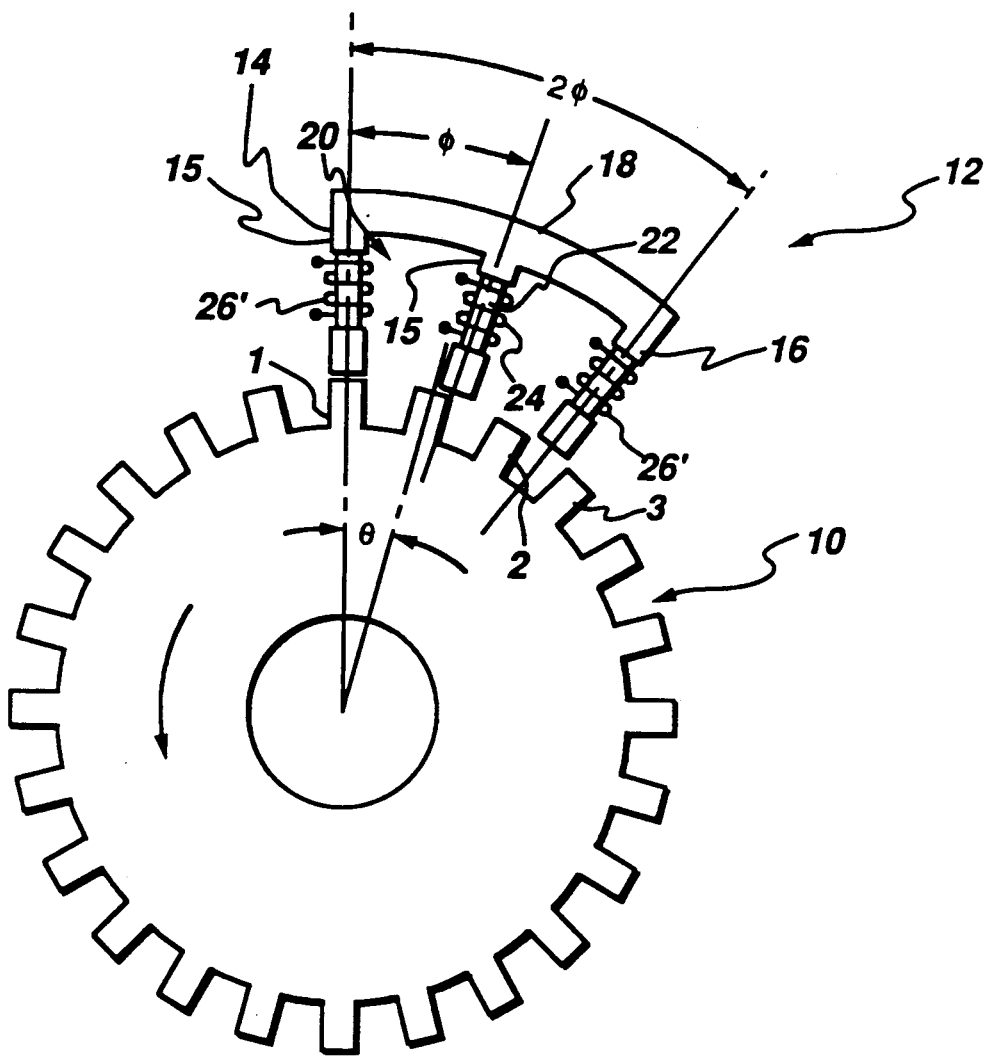
FIG. 2 illustrates a Wiegand-effect shaft position sensor according to the present invention wherein N=2.

In accordance with the present invention, the central stationary pole 15 has a Wiegand-effect device 20 attached thereto. The Wiegand-effect device 20 includes a coil 24 wrapped around a Wiegand wire 22. The stationary poles 14 and 16 on either side of the pole 15 containing the Wiegand-effect device each include a source of magnetomotive force (mmf). For example, as illustrated in FIG. 1, each source of mmf may comprise a permanent magnet 26. Alternatively, as illustrated in FIG. 2, each source of mmf may comprise a current-carrying coil, or solenoid, 26'. In either case, the sources of mmf are mounted on the stationary poles 14 and 16 with reversed polarities. For example, as illustrated in FIG. 1, magnet 26 of pole 14 is mounted with its north and south poles oppositely oriented with respect to those of a separate magnet 26 of pole 16.

Another feature of the shaft position sensor of the present invention is that the pole pitch $\theta$ of toothed wheel 10 is related to the pole pitch $\phi$ of the stationary pole set 12 according to the following expression:

$$2\phi = (N + \tfrac{1}{2})\theta,$$

where N is an integer greater than or equal to one.

In operation, for N=1 as illustrated in FIG. 1, when stationary pole 14 is aligned with pole 1 of toothed wheel 10, the flux through pole 15 is in the opposite direction as when pole 16 is aligned with pole 3. Wiegand-effect device 20 of pole 15 thus experiences a flux reversal at twice the frequency at which poles of the toothed wheel pass those of the stationary pole set 12 and accordingly generates sharp voltage pulses across the terminals of coil 24 indicative of rotor position. Ideally, this flux reversal occurs when the pole 15 containing the Wiegand-effect device is aligned with a pole of the toothed wheel, e.g. pole 2. In practice, the angle of flux reversal tends to lag as rotor speed is increased, but this phenomena can be minimized by using laminated structures, i.e. toothed wheel 10, rotor (not shown), and stationary pole set 12.

FIG. 2 illustrates an alternative embodiment of the shaft position sensor of the present invention wherein the sources of mmf are mounted on alternating poles of stationary pole set 12 comprise current-carrying coils 26'. For purposes of illustration, N=2 in FIG. 2. As in the embodiment of FIG. 1, the alternating sources of mmf are oppositely polarized, and Wiegand-effect device 20 of pole 15 generates sharp voltage pulses at twice the frequency at which poles of the toothed wheel pass those of the stationary pole set, the voltage pulses corresponding to each flux reversal occurring across the terminals of coil 24.

While the preferred embodiments of the present invention have been shown and described herein, it will be obvious that such embodiments are provided by way of example only. Numerous variations, changes and substitutions will occur to those of skill in the art without departing from the invention herein. Accordingly, it is intended that the invention be limited only by the spirit and scope of the appended claims.

What is claimed is:

1. A shaft position sensor for a motor including a rotor having multiple poles mounted to a motor shaft, comprising:

a toothed wheel of magnetic material attached to said motor shaft and having a plurality of poles;

a set of three stationary poles situated proximate to said toothed wheel, pole pitch $\theta$ of said toothed wheel being related to pole pitch $\phi$ of said set of three stationary poles according to the expression:

$$2\phi = \left(N + \frac{1}{2}\right)\theta, \text{ where } N \text{ is an integer;}$$

a Wiegand-effect device, including a coil wrapped around a Wiegand wire, coupled to a central pole of said set of three stationary poles; and means for generating a changing magnetic field in said Wiegand wire, said Wiegand-effect device generating rotor position feedback signals across said coil in response to said changing magnetic field.

2. The shaft position sensor of claim 1 wherein said means for generating a magnetic field comprises a separate permanent magnet attached to each of the stationary poles on either side of said central pole, said permanent magnets having opposite polarities.

3. The shaft position sensor of claim 1 wherein said means for generating a changing magnetic field comprises a current-carrying coil disposed about the stationary poles on either side of said central pole, said current-carrying coils carrying currents of opposite polarities.

4. The shaft position sensor of claim 1 wherein said toothed wheel has the same number of poles as said rotor, the poles of said toothed wheel being substantially equally spaced from each other.

5. The shaft position sensor of claim 1 wherein said toothed wheel has an integral multiple of poles as said rotor, the poles of said toothed wheel being substantially equally spaced from each other.

6. The shaft position sensor of claim 1 wherein said toothed wheel comprises a ferromagnetic material.

7. The shaft position sensor of claim 6 wherein said ferromagnetic material is laminated.

* * * * *